Aug. 30, 1927.
B. M. W. HANSON
1,640,993
METAL WORKING MACHINE
Filed May 26, 1925
7 Sheets-Sheet 1
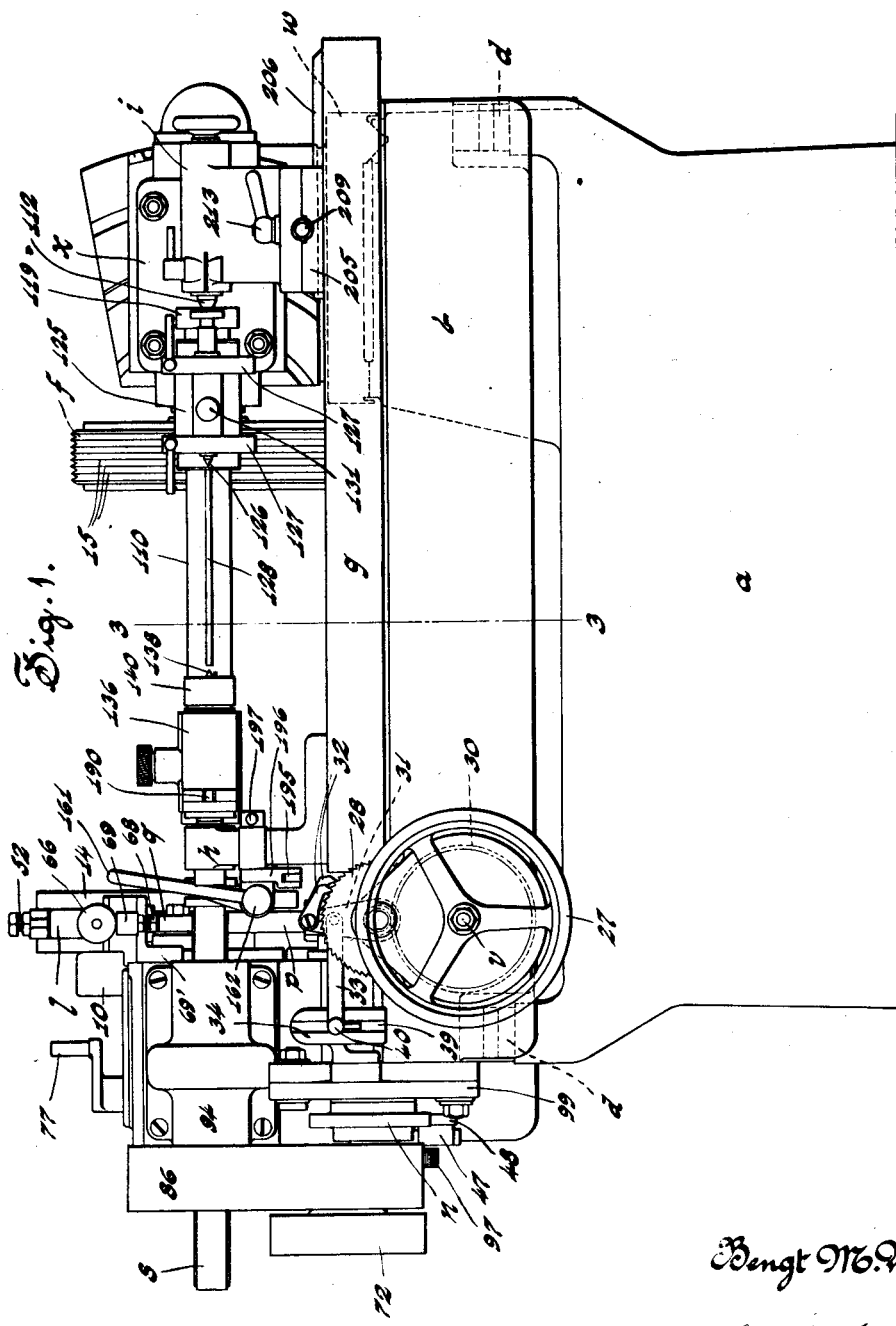
Inventor
Bengt M.W. Hanson
By H. Clay Lindsey.
His Attorney

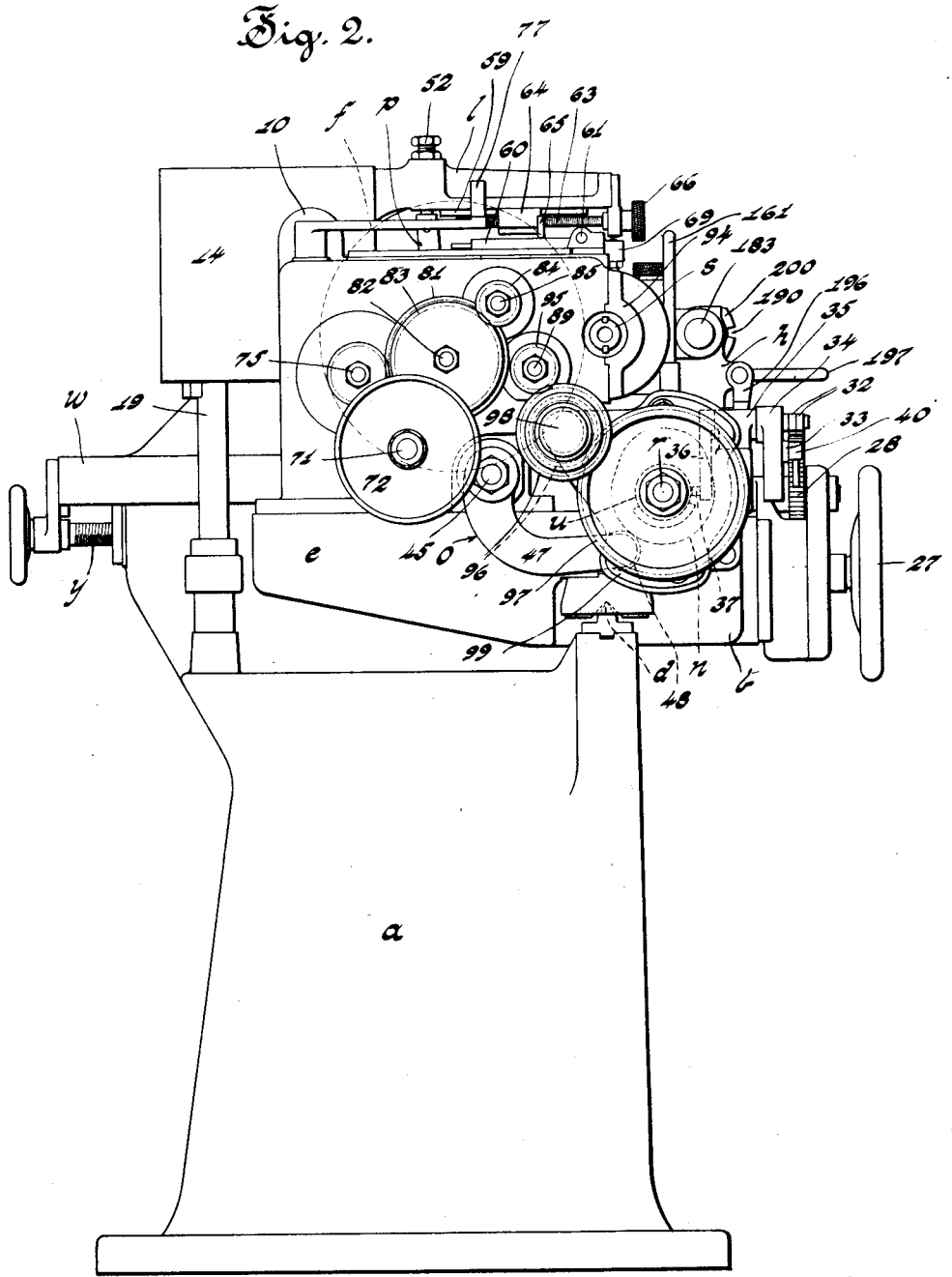

Aug. 30, 1927.
B. M. W. HANSON
1,640,993
METAL WORKING MACHINE
Filed May 26, 1925
7 Sheets-Sheet 3
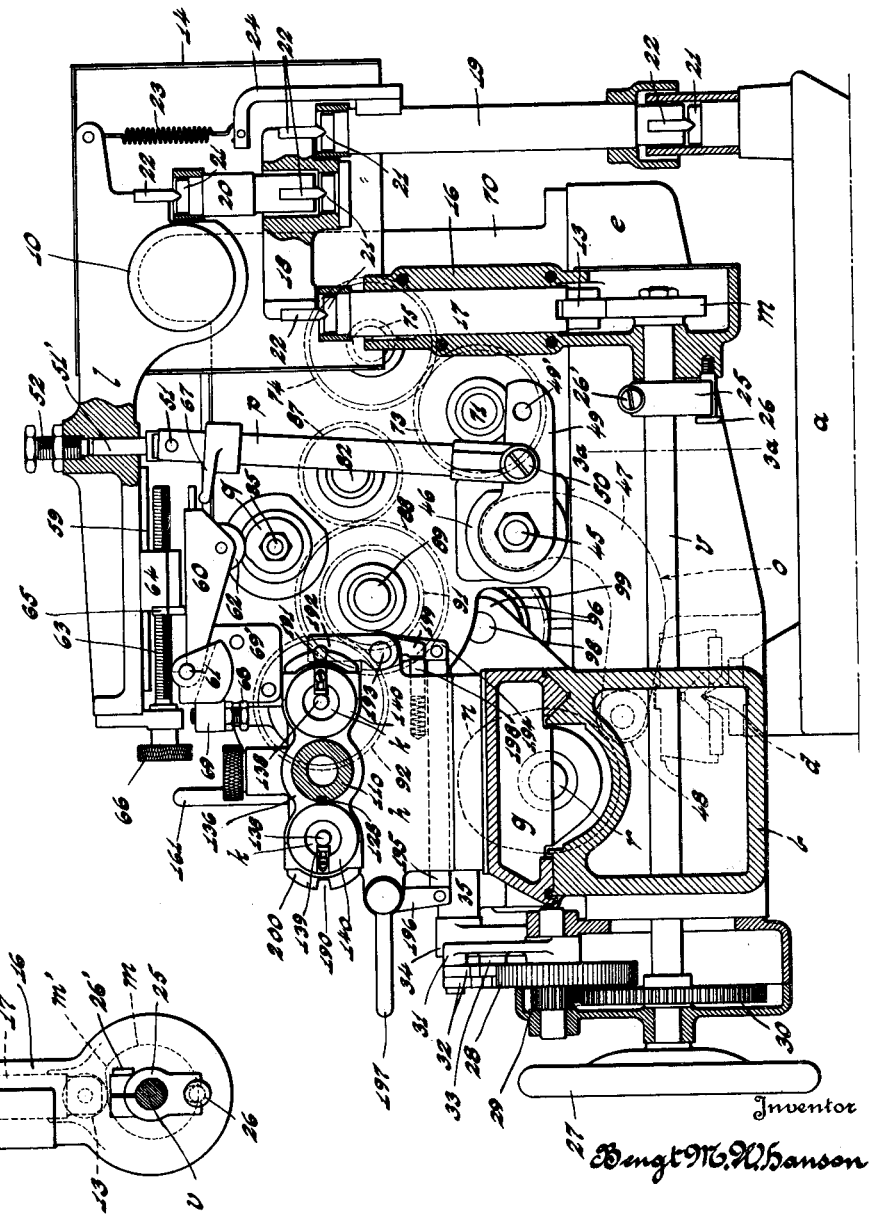
Inventor
Bengt M. W. Hanson
By N. Clay Lindsey
His Attorney

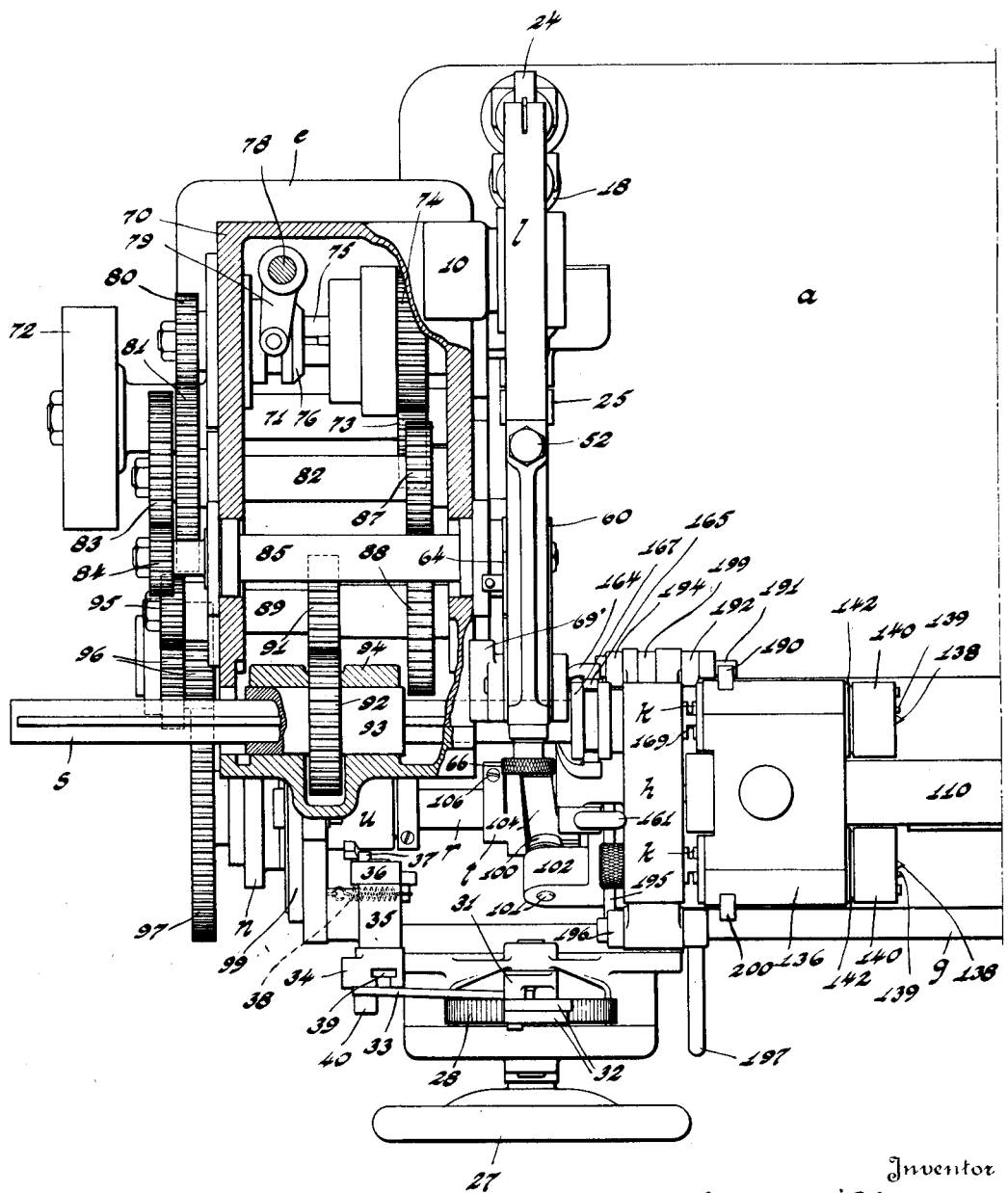

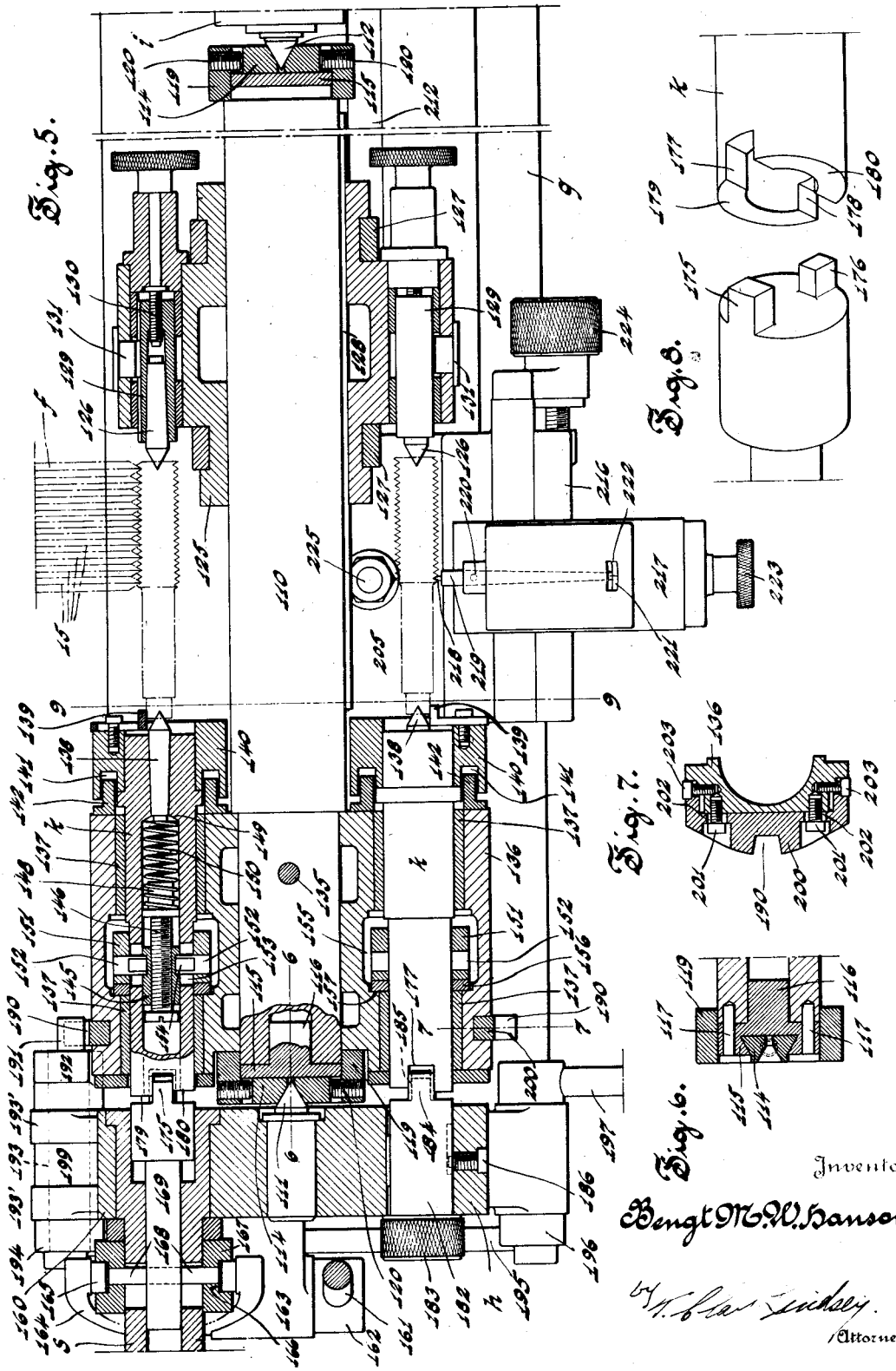

Aug. 30, 1927.

B. M. W. HANSON 1,640,993

METAL WORKING MACHINE

Filed May 26, 1925

Inventor
Bengt M. W. Hanson
By
His Attorney

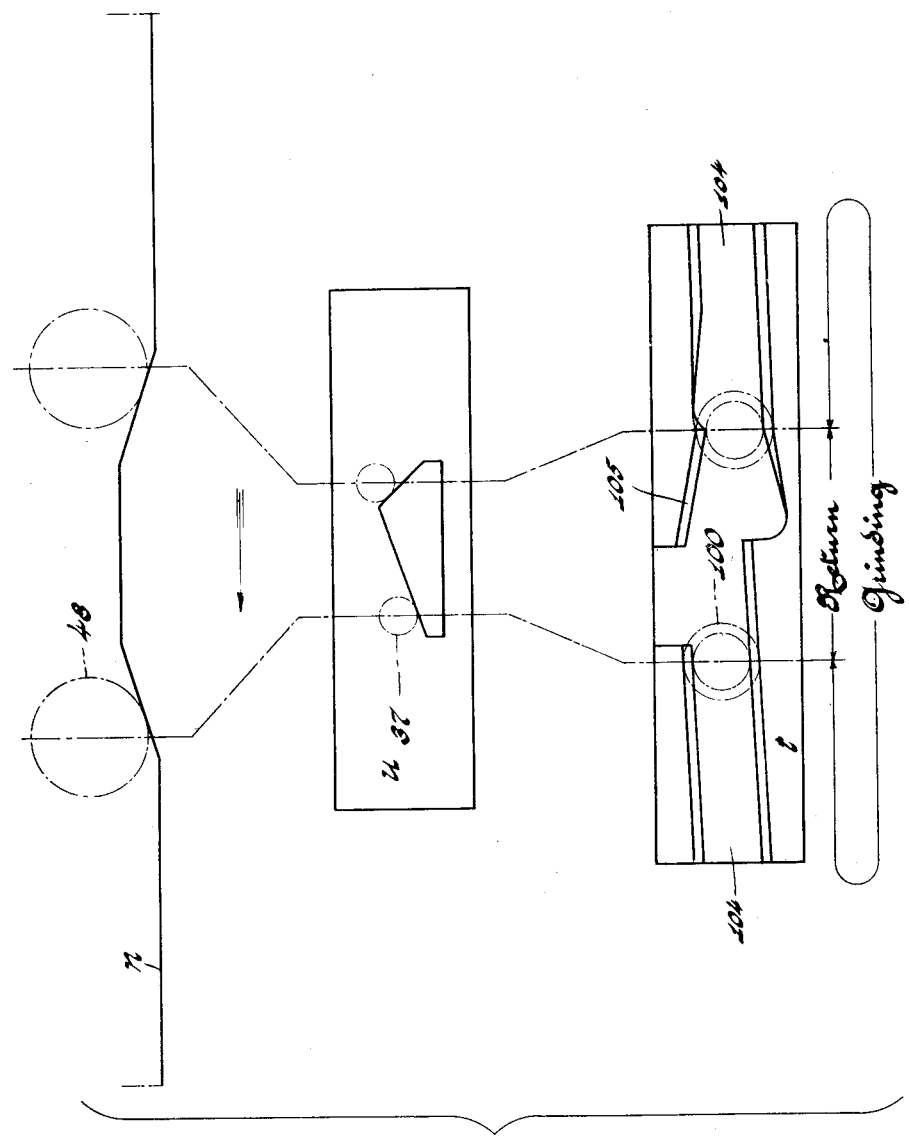

Patented Aug. 30, 1927.

1,640,993

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

METAL-WORKING MACHINE.

Application filed May 26, 1925. Serial No. 33,023.

As an instance of one use to which the machine forming the subject-matter of this invention may be applied, reference may be had to the grinding or finishing of threads. In the present disclosure, which is shown by way of illustration only and is not to be taken as restrictive of my conception, I show and describe my improvements incorporated in a machine for grinding threaded members or the like, and while the invention has peculiar applicability to this use, I wish it to be clearly understood that it is not limited thereto, as the improvements are susceptible of use in various operations. Furthermore, while I have shown but one embodiment of my invention in the drawings, this showing is by way of exemplification only, the invention being susceptible of various modifications and changes in construction and arrangement which would be within the spirit of the invention, and certain of the novel features and characteristics may be employed in other combinations than those herein disclosed.

The general aim of the invention is to provide a machine of the character described having various features of novelty and advantage, and which is particularly characterized by its smoothness in operation, the nicety with which adjustments may be made, the elimination or, at least, the reduction of wear in the parts and resultant errors, and especially by its rapidity in operation, its increased productivity, and its accuracy.

Other objects will be in part obvious and in part pointed out more in detail hereinafter.

The invention accordingly consists in the features of construction, combination of elements, and arrangement of parts which will be exemplified in the construction hereinafter set forth, and the scope of the application of which will be indicated in the appended claims.

In the accompanying drawings, wherein I have shown, for illustrative purposes, one of the many embodiments which the invention may take, Figure 1 is a front view of the entire machine;

Fig. 2 is a left hand end view thereof;

Figure 3 is a sectional view taken substantially on line 3—3 of Fig. 1;

Figure 9:
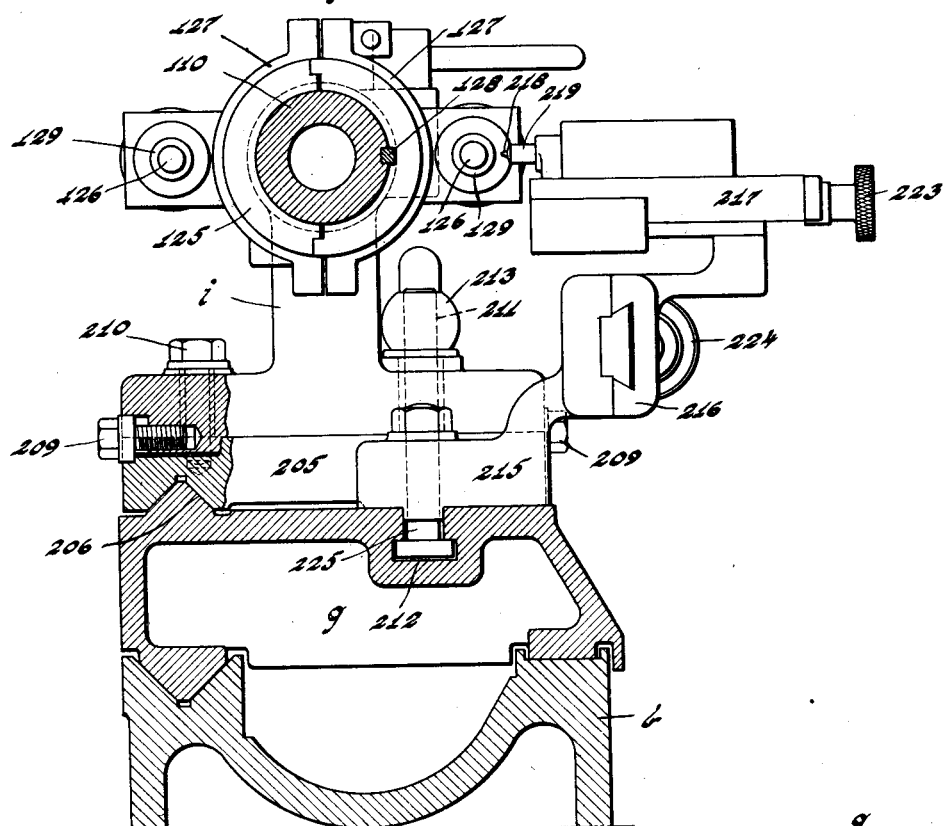
Figure 10:
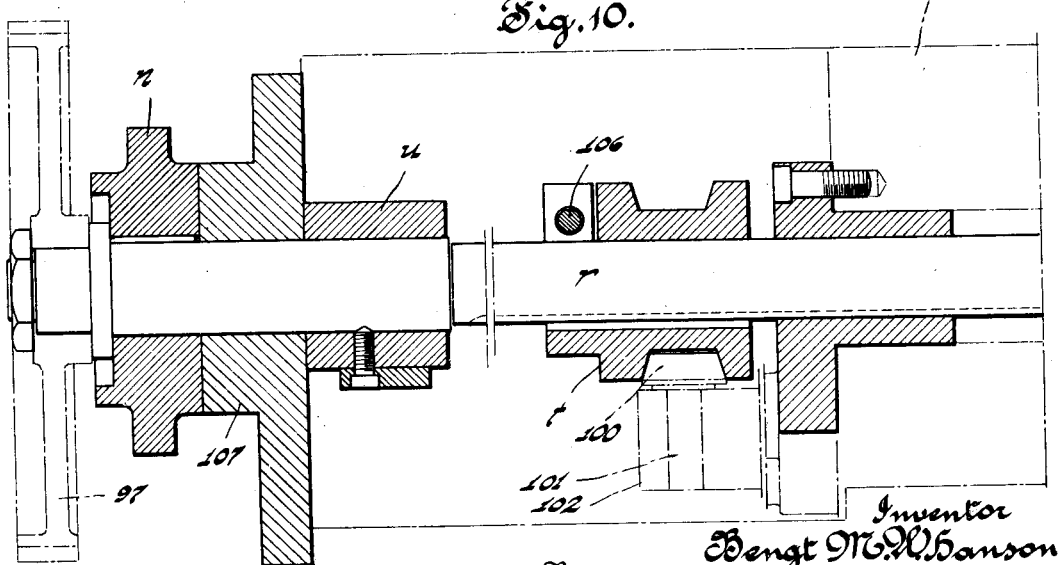

Fig. 3$^a$ is a detail view taken substantially on line 3$^a$—3$^a$ of Fig. 3, and showing the feed cam $m$ and a brake associated therewith;

Fig. 4 is a top plan view of what is shown in Fig. 3, a portion of the gear box being broken away;

Fig. 5 is a top plan view, with parts in section, of the work carrier, the means supporting the same, and the gauge for determining the proper position of the work preliminary to the same being indexed into engagement with the grinding wheel, a portion of the latter of which is shown;

Fig. 6 is a detail view through one end of the element or carrier axle 110, this view being taken substantially on line 6—6 of Fig. 5;

Fig. 7 is a detail view showing an arrangement for varying the indexed positions of the work carrier, this view being taken substantially on line 7—7 of Fig. 5;

Fig. 8 is a perspective view of the adjacent ends of the drive spindle and one of the work spindles;

Fig. 9 is a view of the tail stock and the tail center head of the work carrier and the work gauge, this view being taken substantially on line 9—9 of Fig. 5;

Fig. 10 is a view of the cam shaft and the cams thereon;

Fig. 11 is a diagrammatic view showing the relation between certain of the cams.

The machine herein disclosed, in its general make-up, is somewhat similar to the machine illustrated, described, and claimed in my co-pending application, Serial No. 334,-952, filed November 1, 1919, and, in its preferred embodiment, is provided with a multi-serration grinding wheel, such as forms, in part, the subject-matter of my co-pending application, Serial No. 691,643, filed February 9, 1924.

The arrangement and organization of the principal parts of the machine, in its preferred embodiment, are as follows: $a$ is a pedestal or fixed bed of convenient size and shape upon which is mounted a movable bed $b$ carrying the work holder. In the present illustrative disclosure of the invention, the movable bed $b$ is supported for rocking movement on fulcrums $d$ which are in the form of knife edges, as most clearly shown in Figs. 1, 2, and 3. The rocking bed is preferably in the form of an L, it having a longitudinally extending portion on which the work holder is mounted for sliding movement and a rearwardly extending arm $e$ which carries the various instrumentalities through which the working bed is rocked so as to move the work relative to the tool, the latter being here shown in the form of a grinding wheel $f$ provided with a plurality of circumferential cutting edges or serrations corresponding in shape to the groove of the thread to be formed upon the work. In the present instance, the work holder comprises a main slide or carriage $g$ slidably mounted upon the longitudinally extending leg of the rocking bed, head and tail stocks $h$ and $i$, and a work carrier or support removably supported between the head and tail stock centers. The work carrier has a plurality (preferably two) of work spindles $k$ which are indexible about an axis parallel to the spindles in such manner that when one of the spindles is in an indexed position where the work is presented to and is being operated upon by, the grinding wheel, the other spindle is in a position at which the work previously operated upon may be removed and a new piece of work inserted.

Pivoted on the rearwardly extending arm $e$ of the rocking bed is a rocking beam $l$ with which cooperates the various instrumentalities for imparting a rocking movement to the rocking bed and the work carried thereby. In the present instance, this rocking beam is pivoted as at 10. The instrumentalities for rocking the rocking bed are three in number, being, first, mechanism including a cam $m$ for feeding the work to the tool when a new chip is to be taken; second, means including a cam $n$, a bell crank $o$ and a rod $p$ for moving the work from the tool during the reverse stroke of the work; and, third, means including a pattern cam $q$ for rocking the bed in accordance with the circumferential contour of the work operated upon as in the case of a tap which is to be relieved back of its cutting edges. The letter $r$ indicates a cam shaft driven through suitable gearing in timed relation with the pattern cam $q$ and a driving spindle $s$ with which the work spindles are adapted to be engaged when in proper indexed relation to the grinding wheel. Fixed to this cam shaft is a cam $t$ for reciprocating the work holder, a cam $u$ for intermittently imparting, through a feed shaft $v$, a rotary movement to the feed cam $m$, and the heretofore mentioned cam $n$.

As shown in Figs. 1 and 2, mounted on the fixed pedestal $a$, rearwardly of the longitudinally extending leg or portion of the working bed $b$, is a slide $w$ which is adjustable transversely of the work carrier. Mounted on this slide is a bearing $x$ in which is journaled a spindle suitably driven and carrying the grinding wheel $f$. The bearing $x$, together with the grinding wheel shaft carried thereby, is angularly adjustable to permit the grinding wheel to be brought into inclined position corresponding to the lead of the thread to be ground. The grinding wheel slide $w$ may be adjusted towards and away from the work carrier by turning a screw $y$ shown most clearly in Fig. 2.

Referring now to the construction more in detail, the grinding wheel $f$ may be in the form of a cylindrical member having a plurality of circumferential cutting edges or ribs 15 spaced apart in accordance with the pitch of the thread to be ground. In the present instance, each cutting edge conforms exactly to the configuration and size of the groove of the thread operated upon. Preferably, the serrations or cutting edges of the grinding wheel are so spaced apart that they will grind non-adjacent convolutions of the thread groove so that the heating effect on the work is minimized and sufficient space is provided between the serrations or cutting edges to permit of the flow of a suitable cooling fluid. In the present instance, where it is assumed that the work has a single thread, the serrations or cutting edges on the wheel are shown spaced apart at a distance twice the pitch of the thread, but it is obvious that they may be otherwise spaced. Where the serrations are spaced apart twice the distance of the pitch of the thread, as shown, the cam $t$, as hereinafter described more in detail, is so constructed and adjusted that, during the cutting operation, the work will be moved a distance substantially equal to that between serrations, and during this time, the work will be rotated about two complete revolutions. Thereafter, the work will be moved out of engagement with the grinding wheel, and the work will be returned on an inoperative stroke.

The mechanism for feeding the work to the tool, when a new cut is to be taken, will now be described. This mechanism includes the feed cam $m$ fixed to the rear end of the feed shaft $v$ suitably journaled in the rocking bed $b$ (see Figs. 3 and 3$^a$). The cam $m$, as shown most clearly in Fig. 3$^a$, is in the form of an involute spiral having a high point $m'$. Mounted for vertical sliding movement in a bearing 16 is a bar 17 on the upper end of which pivotally rests one end of a lever 18, the other end of this lever, in turn, being fulcrumed upon the upper end of a rod 19 pivoted adjacent the rear edge of the base or fixed pedestal $a$. The lower end of the bar 17 carries a roller 13 resting on the cam $m$. The rear end of the rocking beam $l$ pivotally rests upon the upper end of the link 20, the lower end of which is fulcrumed on the lever 18 preferably at a point which is nearer the rod 19 than the bar 17. In order that there may be smoothness and freedom in the movements of the parts just described, and for the purposes of eliminating binding action and wear, and reducing friction therebetween, there are provided between the rod 19 and the base a; the bar 17 and the lever 18; the rod 19 and the lever 18; the link 20 and the lever 18; and the link 20 and the rocking beam l, knife edge fulcrums each of which includes a V rest 21 of hardened material and a knife edge 22 engaging in the V notch of its respective rest. For the purpose of counterbalancing the rocking beam l, there may be provided a spring 23 connected at its respective ends to the rear end of the beam l and a bracket 24 connected to the rod 19. The rear end of the rocking beam carries a shield 14 shown in Figs. 2 and 3, and omitted in the other figures. Preferably, a braking or frictional action is exerted upon the feed shaft v for the purposes of preventing over-running and accidental rotation of the shaft. To these ends there may be frictionally secured to the feed shaft v a collar 25 (see Figs. 3 and 3ª) which is held against rotation by a fixed pin 26 which it straddles. The frictional engagement between the shaft and collar 25 may be varied by a screw 26'. The feed shaft v may be manually rotated by a hand wheel 27. This shaft is automatically rotated with an intermittent movement through mechanism including a ratchet wheel 28 geared to the shaft v by a pinion 29 and a gear 30 (see Figs. 1 to 4, inclusive). Carried by a pivoted lever 31 is a pair of pawls 32 which may be of unequal lengths, as shown, and for a purpose well understood in the art. The lever 31 is connected by a link 33 to an oscillating arm 34 carried by a pin journaled in a bearing 35 and having, on its rear end, as shown most clearly in Figs. 2 and 4, an arm 36 with a stud or pin 37 adapted to co-operate with the cam u on the cam shaft r. This cam u, as shown most clearly in Figs. 4 and 11, is so arranged that, during the return stroke of the work, and at which time the work is out of engagement with the grinding wheel, the feed shaft v, through the ratchet, is rotated one step in a clockwise direction. After the high point of the cam u has passed the stud 37, a spring 38 moves the lever 31 and pawls 32 counterclockwise so that, when the cam again comes around, the pawls will be in a position to again rotate the feed shaft a slight extent. To the end that the extent of feeding movements of the work to the tool and the resultant depth of cuts taken may be controlled with great nicety, means is provided for adjustably connecting the link to the crank arm 34. This means may take the form of a diametrical or radial T-groove 39 in the crank arm, and a T-bolt 40 carried by the link 33 and engaging in the groove, as shown in Figs. 1 and 4. The farther away the bolt 40 is from the axis of the crank arm the greater will be the extent of feeding movement of the work towards the tool.

It will be observed that the rocking bed is supported at the front on the knife edges d and is supported at the rear, through the rocking beam and the variable connection, including the lever 18 and the rod 19, on the rear end of the fixed pedestal a. Assuming that the machine has been properly set up to operate upon a piece of work, the roller 13 will engage upon the involute portion of the feed cam m, and this cam will be intermittently rotated counterclockwise by the cam u acting through the ratchet mechanism, including the wheel 28. The cam m will be given a slight rotary movement upon each inoperative stroke of the work holder. When the cam m is thus rotated, the bar 17 will move downwardly slightly in its support 16, which means that the forward end of the lever 18 will be lowered, thereby reducing the distance between the rear end of the rocking beam and the rear end of the base a so that the rocking bed is swung slightly downwardly and rearwardly so as to feed the work a slight distance towards the tool. As hereinafter described more in detail, the machine is so set up that when the cam m reaches the position shown in Fig. 3ª, and in which position the roller 13 engages the lowermost portion of the cam, the work has been brought to the proper diameter and, upon further rotation of the cam in a clockwise direction, the roller will ride quickly up onto the high point thereof, thereby moving the work away from the grinding wheel and thus assuring that the work will not be ground to too small a diameter. It will further be observed that the variable connection, through which the feeding movement takes place, is so constructed that there is no wear between the parts, friction is reduced, and binding is substantially eliminated. More particularly, it will be seen that when the bar 17 is vertically moved in its bearing 16, the lever 18, link 20 and rod 19, due to the knife edge arrangements associated therewith, may move relatively to one another with easy, smooth movements, and without tending to disturb the engagement of the knife edges in their respective V notches. When the bar 17 is moved, the rod 19 and the link 20 will rock or sway slightly on the knife edges provided at the lower ends thereof.

Reference will now be had to the mechanism for raising the rocking bed away from the work on the completion of the operative stroke of the latter, and moving it again towards the work when a new cut is to be taken. This means, as previously stated, includes the lifting cam n, the bell crank o, and the rod p. The cam n is fixed to the cam shaft r in proper co-ordinated relation to the cams t and u, as shown in Figs. 10 and 11. The bell crank includes a shaft 45 journalled in a bearing 46 and having at one end a curved arm 47 provided at its free end with a roller 48 adapted to engage the cam n. The other arm 49 of the bell crank is connected to the lower end of the rod p by a bolt 50. By preference, the arm 49 has a plurality of openings, for instance, two, as shown, spaced along its length and adapted to selectively receive the bolt 50, whereby the extent of movement of the rocking bed may be varied at will. In case a thread of coarse pitch is to be operated upon, the rod p will be connected in the outermost opening 49' of the arm 49 so as to obtain a maximum lifting movement of the rocking bed. The upper end of the rod p is pivotally connected, as at 51, to a slidable pin 51' which, when the cam n operated the bell crank o, abuts against an adjustable screw 52 carried by the long end of the rocking beam l. It is understood that, when the cam n raises the forward long end of the rocking beam, this beam will turn with respect to the rocking bed and is fulcrumed on the link 20, the result being that the rocking bed is rocked forwardly and upwardly to withdraw the work from the grinding wheel, and when the cam lowers the long end of the rocking beam, the work is rocked rearwardly and downwardly into engagement with the grinding wheel.

For the purpose of rocking the bed, together with the work thereon, in such manner that the wheel will cut an irregular circumferential contour on the work, as, for instance, where the teeth of a tap are to be relieved, the relieving or pattern cam q is provided (see Fig. 3). This cam, in the present instance, has a single rise or lobe, and is so connected up or associated with the driving spindle for the work spindles and the cam shaft as to be driven in proper relation thereto. For the purpose of varying the extent to which the rocking bed and work are rocked by the cam q, and thereby determine the extent of relief in the work, there is provided a piece 60 pivoted as at 61 to the rocking bed and carrying a roller 62 resting upon the cam q. Journaled in the long end of the rocking beam is a screw 63 on which works a nut 64 slidably carried by a way 59 on the under side of the beam l. This nut is provided with a finger 65 resting on the piece 60. The screw 63 may be rotated by a hand wheel 66. It will be understood that when the finger rests on the piece 60 adjacent the pivot 61, the rocking bed will be rocked by the cam q to a lesser extent than would be the case if the finger rested upon the piece adjacent the free end of the latter.

In order to raise the piece 60 out of engagement with the cam q, and thus eliminate the annoyance and jars resulting from the anti-friction roller 62 riding on this cam during the reverse stroke of the work and during which time the finger 65 is raised out of engagement with the piece by the cam n, there is provided on the rod p a projection 67 which is adapted to engage and lift the free end of the piece when the cam n lifts the long end of the rocking beam. In the event it is desired to throw the rocking beam out of the control of the pattern cam q as, for instance, when a threaded member having no relief is to be ground, the screw 68 is screwed up in a boss 69 in which it is located. This boss is carried by a bracket 69' secured to the gear box and carrying the pivot pin 61. When the screw 68 is raised, the forward end of the rocking beam is adapted to rest thereon except when it is raised therefrom by the lifting cam n.

The various mechanisms described are driven as follows: Referring to Figs. 1, 2, and 3, journaled in a gear box 70 on the rearwardly extending arm d of the rocking bed is a main shaft 71 having a drive pulley 72. The main shaft drives, through gears 73 and 74, a clutch shaft 75 on which is mounted a clutch including a slidable sleeve 76. This clutch is not shown in detail, as it may be of any suitable construction, it being sufficient to say that, when the sleeve is moved to one position, the clutch is disengaged, and when moved to the opposite position, the clutch is engaged. The sleeve 76 may be manually shifted by a handle 77 fixed on the upper end of a shaft 78 carrying within the gear box, a yoke 79 associated with the sleeve in the usual manner. On the outer end of the clutch shaft 76 is a gear 80 meshing with a gear 81 on a supplemental shaft 82 carrying a gear 83 meshing with a gear 84 fixed to one end of a shaft 85 which carries on its other end the pattern cam q. The gears 80, 81, 82, 84, and others, may be enclosed within a housing 86, the housing being omitted except in Fig. 1. Carried by the shaft 82 within the gear box is a gear 87 meshing with a gear 88 on an intermediate shaft 89 provided with a gear 91 meshing with a gear 92 fixed to a sleeve 93 to which the driving spindle s is splined so that the sleeve 93 and spindle will rotate in unison, but the spindle may have longitudinal movement within the sleeve. This sleeve 93 is journaled in a bearing 94. Fixed on the outer end of the shaft 89 is a gear 95 which drives, through suitable change gears 96, a gear 97 fixed to the end of the cam shaft r. The gears 96 may be mounted on a stub shaft 98 carried by a rocker arm 99 in the same manner as change gears are usually carried.

The cam $t$, which, as stated, is secured to the cam shaft $r$, has a circumferential cam groove in which engages a roller or follower 100, journaled on a pin 101 carried by a lug 102 extending from the left hand end of the main slide $g$ (see Figs. 4, 10, and 11). The cam groove has a pitch portion 104 and a return portion 105. The pitch portion 104, in which the follower 100 engages while the cam is moving the work on its operative stroke, is so inclined as to move the work axially at a rate corresponding to the pitch of the thread being ground. In the present illustrative disclosure, since it has been assumed that pieces of work, each having a single thread, are operated upon, and the grinding wheel has its serrations spaced apart at a distance twice the pitch of the thread, the pitch portion of the cam may be of such length that it moves the work holder on its operative stroke while the work is making four complete revolutions. During the first revolution of the work the same is moved into engagement with the wheel by the lifting cam $n$, during the second and third revolutions the grinding wheel is operating upon the work, and during the fourth revolution the work is lifted away from the wheel by the lifting cam. The return portion 105 of the cam is such as to return the work on its inoperative stroke, preferably while the work is making one complete revolution. It is, of course, understood that the construction of the cam $t$, and the arrangement of the surfaces thereof, may be varied, as desired, in accordance with the requirements to be made. The specific arrangement just described is disclosed for illustrative purposes only.

For the purpose of allowing adjustment of the work holder on the rocking bed, so that pieces of work of different lengths, or pieces of work having threaded portions to be ground at different distances from their ends, may be held on the carrier for grinding operations, the cam $t$ is adjustable longitudinally of the shaft $r$. In the present instance the cam $t$ is splined to the shaft and is adapted to be secured in any position of adjustment by a screw 106. The shaft is journaled against longitudinal movement in a bearing 107 on the rocking bed $b$.

Reference may now be had to the work carrier which, in its arrangement, construction, and application, has various features of novelty and advantage. This carrier, in the present illustrative embodiment, includes, as shown most clearly in Fig. 5, an axle 110 adapted to be rotatably supported between the head and tail stocks $h$ and $i$; a head 136 secured to the axle and provided with a plurality of rotatable work holding devices, such as the work spindles $k$, spaced at equal distances from the longitudinal center of the axle, there being shown, in the present instance, two such spindles positioned on opposite sides of the axle and independently movable longitudinally thereon; and a head 125 longitudinally adjustable upon the axle and provided with longitudinally adjustable tail centers 126 corresponding in number to the work spindle $k$ and respectively alined therewith. The carrier is adapted to be indexed so as to bring into operative relation to the grinding wheel the successive pieces of work supported between the respective work spindles and the alined tail centers. In each indexed position of the carrier, one of the work spindles is engaged with the driving spindle $s$ and holds a piece of work in grinding position. While that piece of work is being operated upon, the other work spindle is in a loading position where the previously ground piece may be removed and replaced with a new piece of work. The work spindles, when in loading position, are held in the same angular relation with respect to a work guage, and the work spindles, when engaged with the driving spindle, always bear the same angular relation thereto so that the pieces of work may be properly positioned on the carrier and then indexed into proper engagement with the grinding wheel.

In the present illustrative embodiment, the axle or supporting element 110, which may be in the form of a cylindrical or tubular member, has, at its opposite ends, female centers adapted to respectively receive the male centers 111, 112, of the head and tail stocks $h$ and $i$, respectively. In order to permit of lateral adjustment of the axle 110 relative to either or both of the centers 111, 112, the female centers are provided with adjustable blocks located in dovetail grooves in end pieces 115. The end pieces may each have a central stud 116 extending into a central bore of the axle and may be secured in place by dowels 117. About and extending beyond each end of the axle is a ring or collar 119 having, at diametrically opposite points, adjusting screws 120 adapted to engage the opposite ends of the respective block 114. The arrangement just described is of advantage in that it permits of a very fine and nice adjustment of the carrier with respect to the axis about which it is indexed. In the event, due to errors in manufacture, wear, or other cause, the work spindles or tail centers are at slightly different distances from the longitudinal center of the axle 110, or out of proper parallelism, the blocks may be adjusted so that the axes of the work spindles and tail centers are at exactly like distances from, and in parallelism with, the axis provided by the centers 111, 112, which means that the successive pieces of work will bear the same radial relation to the grinding wheel when indexed into engagement therewith.

The head 125 which carries the tail centers 126 may be formed in two parts clamped together by clamping rings 127. The head is splined to the axle by a key 128 so that the head rotates with the axle but may be adjustable longitudinally thereon. Mounted at opposite sides of the axle and at equal distances therefrom are the centers 126 carried by holders 129 adapted to be longitudinally adjusted by screws 130 journaled against longitudinal movement in the head and having threaded engagement with the holders. The holders 129 are held against rotation by keys 131. It will be noted that the head 125, as a whole, may be adjusted longitudinally of the axle and then clamped in place so that pieces of work of different lengths may be accommodated; also, the tail centers are independently adjustable so that the respective pieces of work supported between the same and the work spindles may be very accurately set or adjusted in proper relation to the grinding wheel, as hereinafter described more in detail.

Secured by means of a dowel pin 135 to one end of the axle 110 is the head 136 having, at opposite sides of and spaced at equal distances from the longitudinal center of the axle, bores which receive the work supporting spindles $k$. In the present instance, these bores are lined with bushings 137. Each of the spindles $k$ carries, at its forward end, a work supporting element or device, such as a work center 138 and, also, if desired, a driving dog 139 which serves the purposes of preventing the work from rotating relatively to the centers and of angularly positioning the work with respect to the work spindles. The dogs may be carried by rings 140 fitting about the forward ends of the work spindles and having grooves 141 adapted to accommodate annular dust guards 142 carried by the head 136.

In order to allow the respective tail centers to be independently and longitudinally adjusted in such manner that the pieces of work supported between the pairs of alined centers will be in proper longitudinal relation to the grinding wheel, and the pieces of work will be securely and steadily held between these centers, the work spindles are mounted for sliding movement in the head 136 and resiliently urged towards the respective tail centers. The arrangement is further such that the force with which the pieces of work are gripped between the alined centers may be varied in accordance with the character and size of the work. In the present instance, each of the work spindles $k$ is hollow to slidably accommodate a nut 145 through which extends an adjustable screw 146 bearing at its forward end against a cap 148 between which and an abutment 149 on the work spindle is interposed a spring 150. The nut 145 is connected to a slidable collar 151 by pins 152 which extend through elongated slots 153 in the work spindle. The pins, where they pass through the slots 153, may be flattened on opposite sides at 154. The bore, which receives the work spindle, may be cored out as at 155 so as to accommodate the collar 151. This collar engages against the brass ring 156 bearing against the shoulder 157 on the head. It will be seen that with the arrangement just described, the spring 150 normally urges the work spindle forwardly towards its opposed tail center. This spring also, acting through the screw 146, nut 145 and pins 152, presses the collar 151, which rotates with the work spindle, against the bearing ring 156. If the pieces of work are relatively small, in which event they may be held with relatively slight pressure between the pairs of centers 126 and 138, the screws 146 may be adjusted so that the springs 150 are under but little compression. In the event that the pieces of work are relatively large in diameter and, therefore, quite strong, it may be desirable to hold the piece of work with greater pressure between the centers, in which event the springs will be put under greater pressure by turning up the screws 146.

The driving spindle $s$, as previously stated, has longitudinal movement in, and is splined to, the sleeve 93 journalled in the bearing 94. The forward end of the spindle is journalled in a bearing 160 provided in the head stock $h$ to one side of the center 111. The driving spindle has, at its forward end, a clutch member 169 which is moved into and out of engagement with the respective work spindles by means of a handle 161 fixed to one end of a rock shaft 162 journalled in a bearing 163 extending from the head stock $h$. On the other end of this rock shaft is a yoke lever 164, the arms of which carry rollers 165 engaging in a circumferential groove 166 of a collar 167 connected by a pin 168 to the member 169. The collar 167 slides on the driving spindles.

It will be understood, of course, that the driving spindle, through the driving connections previously described, is rotated in proper timed relation to the movements of the work holder so that, during the grinding operation, the work is rotated and longitudinally moved in accordance with the pitch of the thread thereon. As hereinafter described more in detail, there is provided on the main slide $g$ of the work holder, a gauge or indicator for properly locating the work between the centers. Because of the inclination of the thread on the piece of work, the proper engagement of the work and wheel during the grinding operation will depend upon not only the longitudinal positioning of the work relative to the gauge, but the angular relation of the work spindle to the gauge during the gauging operation and the angular relation of the work spindle to the driving spindle when engaged. In order that the successive pieces of work may be properly adjusted in loading position and then properly presented to the grinding wheel, the successive work spindles, while in gauging or loading position bear the same angular relation to the gauge, and the spindles are successively engaged, in operating position, with the driving spindles *s* in the same angular relation. For the purpose of engaging the driving spindle and the several work spindles in the same angular relation, the clutch member 169 of the driving spindle is provided with a pair of diametrically alined clutch teeth 175 and 176, the former of which is wider and longer in the direction of the axis of the driving spindle than is the other one (see Fig. 8). Each work spindle has a pair of notches 177 and 178 respectively corresponding in width to the teeth 175 and 176 and adapted to respectively receive the clutch teeth 175 and 176, but not otherwise. One of the surfaces 179 of each work spindle between the notches 177 and 178 extends beyond the other surface 180. With this arrangement, in the event that the clutch member 169 should be advanced at such a time that the long tooth 175 should engage the surface 179, this tooth will ride over that surface, jump across the narrow notch 178, land on the surface 180 and ride from this surface into the notch 177 and, at the same time, the tooth 176 will engage in the notch 178. In the event that the member 169 on the spindle is advanced at such a time that the long tooth should engage the surface 180, this tooth will ride immediately into the notch 177. In any case, the driving spindle and work spindles, when engaged, always bear the same relation to one another. For the purpose of holding the work spindle when in loading position in the same angular relation to the gauge, the following arrangement is possible: Carried by the head stock *h* to that side of the center 111 opposite the driving spindle *s* is a manually slidable plunger 182 having, at one end, a knob 183 and, at its other end, clutch teeth 184 and 185 corresponding to the clutch teeth 175 and 176, respectively. These teeth are adapted to be respectively engaged in the notches 177 and 178 of the work spindles when the latter are in loading position. The plunger 182 is held against rotation by a key 186.

For the purpose of properly indexing the work carrier and holding the same in indexed position, the head 136 is provided at substantially diametrical points with notches 190 in which is adapted to engage a positioning pawl 191 (see Figs. 3 and 5). The notches 190 preferably taper down in width towards their bottoms and the pawl 191 is round. Therefore, in spite of wear, the pawl will always have a wedged fit in the notches, insuring that there is no play between the parts and the carrier is properly indexed with respect to the grinding wheel. The pawl 191 is carried by an arm 192 fixed to one end of a pin 193 journaled in bosses 193' on the head stock *h*. On the other end of this pin is a depending arm 194 connected by a link 195 to a bell crank 196 journaled in the forward side of the head stock and one arm of which constitutes an operating handle 197. The pawl 191 is normally urged into operative or engaging position by a spring pressed plunger 198 pressing against an arm 199 secured to the pin 193 between the bosses 193'. Either or both of the notches 190 may be provided in adjustable blocks, one of which is shown in Fig. 7. This block 200 is adjustably secured to the carrier by screws 201 passing through elongated slots 202 in the block and threaded into the head 136. The position of the block may be varied by means of the adjusting screws 203.

The tail stock *i*, as most clearly shown in Fig. 9, includes a base 205 mounted for adjustment on ways 206 extending longitudinally of the main slide *g*. The tail stock is adjustable transversely of the base so as to permit lateral adjustment, relative to the grinding wheel spindle, of one end of the axis about which the carrier is indexed. By adjusting the tail stock the work centers may be brought into parallelism with the line of movement of the work holder; also, the tail stock may be laterally adjusted so that a taper on the work may be had. In the present instance, the tail stock is laterally adjusted by screws 209 and is clamped in adjusted position by a clamping screw 210. The tail stock, as a whole, is clamped in any predetermined longitudinal position of adjustment by a clamping bolt 211 having a head engaging in a T-slot 212 extending longitudinally in the upper surface of the main slide *g*. The upper end of the bolt 211 has a nut 213.

In order that the pieces of work may be quickly adjusted with great accuracy and precision on the carrier so that, when the successive pieces of work are indexed into grinding engagement with the grinding wheel, they will bear the proper relation thereto, I provide an indicator or work gauge preferably located on the main slide *g* of the work holder. This work gauge as shown most clearly in Figs. 5 and 9, includes a bracket 215 adjustably mounted on the main slide *g* of the work holder, a slide 216 mounted for longitudinal adjustment on the bracket 215, and a transverse slide 217 mounted on the slide 216. Mounted on the slide 217 is a work gauge or indicator which may be of any suitable construction, but which is here shown as including a pointer 218 carried by a manifying lever 219 pivoted as at 220 and having a long arm the end of which is adapted to move with respect to a scale 221. The arm may be housed, as shown, and this housing may have an opening 222 through which the end of the lever may be observed. If desired, this gauge may have the general construction shown in my co-pending application Serial No. 640,348 filed May 21, 1923. The cross slide 217 may be adjusted towards and away from the carrier by turning a screw 223, and the slide 216 may be longitudinally adjusted by a screw 224. The bracket 215 is clamped in place on the main slide g by a clamping bolt 225, the head of which is adapted to engage in the T-groove 212. The work gauge may be removed by sliding the tail stock from position and then sliding the bracket 215 to the end of the groove 212.

The machine is set up and operated briefly as follows: A test piece, which may consist of one of the pieces of work, is positioned between one pair of centers 126 and 138, and the carrier is indexed so as to bring the test piece into a position where it may be operated upon by the grinding wheel. The feed shaft v is turned so as to bring the cam m into the position shown in Fig. 3ª, and in which position the roller 13 rests upon the low portion of the cam. The pawls 32, through which the feed shaft is automatically and intermittently turned, are raised out of engagement with the ratchet wheel 28. The power is then thrown on the machine, whereupon the work holder, including the slide g and the carrier mounted thereon, will be moved back and forth by means of the cam in a manner previously described. The work spindle k, which holds the test piece in operative position, is rotated by the driving spindle s, this driving spindle being driven in timed relation to the cam t through the connections described. The grinding wheel is manually advanced slightly towards the work on each inoperative stroke of the work holder by moving the grinding wheel slide q through the screw Y. The grinding wheel is fed into the work until the operator has determined, by measurement, that the test piece has been ground to the same diameter as that to which the work is to be ground. The power is then thrown off the machine, the pawls 32 are thrown into engagement with the ratchet wheel 28, and the cam m is turned to bring the high point m' thereof beneath the roller 13. The carrier is then indexed so as to bring the test piece, which has been operated upon, into loading position, and the gauge is then set (by adjusting the slides 216 and 217) so that when the pointer 218 properly engages in the thread groove of the test piece, the long end of the lever 219 will register with the zero mark of the scale 221. During the setting of the gauge, the clutch teeth 184 and 185 of the plunger 182 will be engaged in the notches of the work spindle which carries the test piece. The test piece is now replaced with a piece of work. This piece of work is set with respect to the gauge by longitudinally adjusting the tail center 126. Such adjustment being possible because the work spindle is longitudinally movable under the influence of the spring 150. The carrier is indexed so as to bring the piece of work into operative relation to the grinding wheel and the carrier is held in this indexed position by the engagement of the pawl 191 in the notch 190. The power is then thrown on the machine and the clutch member 169 of the driving spindle is advanced by the handle 161 so as to engage the driving spindle with the work spindle.

As previously pointed out, owing to the construction of the clutch teeth 175 and 176 and the notches in the spindle receiving the same, the work spindle will be engaged with the driving spindle in only one angular position. The cam t will now move the work holder, including the work carrier, longitudinally back and forth through a distance less than the effective grinding length of the grinding wheel, the work holder being moved in one direction in accordance with the lead of the thread on the work, and more quickly in the opposite direction, i. e., on its return stroke. As the work holder starts its operative stroke, the cam n, through the crank o and the rod p, will lower the forward end of the rocking beam so as to move the work into engagement with the grinding wheel. At the end of the operative stroke of the work holder, the cam n will raise the forward end of the rocking beam, thereby moving the work out of engagement with the grinding wheel so that the work will be clear of the wheel during the inoperative stroke of the work holder. Also, during the operative stroke of the work holder, the cam q, where the effect of this cam is desired, will raise and lower the rocking beam in accordance with the circumferential contour to be given to the work. The operation will continue until the feeding cam m has been fed to such an extent that the low point of the cam is beneath the roller 13, and then this roller will ride up the relatively sharp inclined portion of the cam to the high point thereof, at which time the operator may throw the machine out of operation. It is evident that, since the test piece was ground down to size when the roller 13 rested upon the low point of the cam m, and the setting of the grinding wheel was not thereafter disturbed, the pieces of work are ground to the correct size when the cam has been rotated to a position where the low point thereof reaches the roller 13. Since, after that time, the roller is raised by the cam, the work cannot be ground to too small a diameter.

During the operation of the grinding wheel upon one piece of work held between one pair of centers, another piece of work may be properly positioned between the other pair of centers located at loading position so that when the carrier is next indexed, this new piece of work will bear the proper relation to the grinding wheel. This is of the utmost advantage as the rate of production of the machine is greatly increased and the cost of production is correspondingly decreased. The speed of operation of the machine is such that pieces of work, accurate in all particulars, may be obtained at a surprisingly low cost. It is of advantage to mount the indicator or work gauge on the work holder, so that the work gauge moves back and forth with the carrier, because it is then possible to gauge a piece of work in loading position while the grinding wheel is operating on another piece of work.

It will be observed that, since the test piece, after the same was ground, bears a predetermined relation to the grinding wheel, and the gauge is set to this test piece, without disturbing the longitudinal position of the test piece upon the carrier or the relation between the test piece and work spindle supporting the same, the gauge, after it is set to the test piece, bears a predetermined fixed relation to the grinding wheel and a predetermined relation to a work spindle located at loading position. Therefore, the piece of work, which is adjusted to the gauge with the work spindle in the same angular position as was the work spindle carrying the test piece, bears the same relation to the grinding wheel as did the test piece in loading position. Furthermore, since the work spindles are held in the same angular relation at loading position and are engaged with the work spindle in like angular position, it follows that a piece of work properly adjusted at loading position will be in proper relation to the grinding wheel when indexed to grinding position.

It will further be observed that it is necessary to angularly position the pieces of work upon the work spindles so that the flutes on the piece of work during the grinding operation will bear the proper relation to the pattern cam $q$ which, as stated, rocks the rocking bed and the work holder carried thereby in accordance with the circumferential contour of the work. The dogs 139 are used for this purpose. In the case of four fluted taps, the squared ends thereof bear uniform relation to the flutes, and the dogs are so positioned that, when any one of the squared faces of a tap engages a dog, the tap is in proper angular position with respect to the work spindle. In the case of three fluted taps having squared ends, one face of each squared end may be marked so that the operator will know which face to engage with the dog.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a machine of the character described, a fixed bed, a rocking bed fulcrumed thereon, a tool on said fixed bed, a work holder slidably mounted on said rocking bed and having means for rotatably supporting a piece of work, and feeding means for rocking said rocking bed to feed the work relative to the tool and including a lever, a member on said fixed bed supporting one end of said lever, a member on said rocking bed supporting the other end of said lever, said rocking bed being supported by said lever, and means on said rocking bed for vertically moving said last mentioned member to thereby rock the lever and the rocking bed therethrough.

2. In a machine of the character described, a fixed bed, a rocking bed fulcrumed thereon, a tool on one of said beds, a work holder slidably mounted on the other of said beds and having means for rotatably supporting a piece of work, and feeding means for rocking said bed to relatively feed the work towards the tool and including a member on said fixed bed and supporting one end of said lever, a member slidably carried by said rocking bed and supporting the other end of said lever, a link between said rocking bed and lever, knife edge fulcrums between said lever and said members and link, and means for moving said member carried by said rocking bed.

3. In a machine of the character described, a fixed bed, a rocking bed fulcrumed thereon, a tool on one of said beds, a work holder slidably mounted on the other of said beds and having means for rotatably supporting a piece of work, and feeding means for rocking said bed to relatively feed the work towards the tool and including a member arising from, and mounted for pivotal movement on, said fixed bed, a member slidably carried by said rocking bed, a lever supported on said members, a link between said lever and rocking bed, and a cam on said rocking bed for moving said member mounted on said bed.

4. In a machine of the character described, a fixed bed, a rocking bed fulcrumed thereon, a tool on said fixed bed, a work holder slidably mounted on said rocking bed, and feeding means for rocking said bed to relatively feed the work towards the tool and including a vertical rod pivotally supported at its lower end on said fixed bed, a bar slidably mounted in said rocking bed, a lever supported at its opposite ends on said bar and rod, a link between the intermediate portion of said lever and said rocking bed, knife edge fulcrums between said lever and said bar and rod, between said link and lever and rocking bed, and between said bar and fixed bed, and a cam on said rocking bed supporting said bar.

5. In a machine of the character described, a fixed bed, a rocking bed fulcrumed thereon, a tool on said fixed bed, a work holder slidably mounted on said rocking bed and having means for rotatably supporting a piece of work, and feeding means for rocking said rocking bed to relatively feed the work towards the tool and including an involute cam journalled in said rocking bed and a connection between said cam and rocking bed having a vertically movable bar supported on said cam.

6. In a machine of the character described, a fixed bed, a rocking bed mounted thereon, a tool on said fixed bed, a work holder slidably mounted on said rocking bed, and feeding means for rocking said rocking bed to relatively feed the work towards the tool and including a variable connection having a rod arising vertically from said fixed bed and supporting, at least in part, on its upper end the swinging end of said rocking bed, and a knife edge fulcrum between said fixed bed and the lower end of said rod.

7. In a machine of the character described, a fixed bed, a rocking bed fulcrumed thereon, a tool on one of said beds, a work holder slidably mounted on the other of said beds, a rocking beam fulcrumed on said rocking bed, and feeding means for rocking said bed to relatively feed the work towards the tool and including a member arising from said fixed bed, a lever fulcrumed on said member, a link between said lever and rocking beam and having a pivotal connection with each of them, and means for moving said lever about its fulcrum.

8. In a machine of the character described, a base, a rocking bed fulcrumed thereon, a tool on said base, a work holder slidably mounted on said rocking bed and having a spindle, a cam shaft journalled in said rocking bed and driven in timed relation to said spindle, a cam on said shaft for moving said work holder back and forth on said rocking bed, and a cam on said shaft for lifting said rocking bed to withdraw the work from the tool on the reverse stroke of the work holder and to lower the bed to bring the work into relation to the tool on the operative stroke of the work holder.

9. In a machine of the character described, a base, a rocking bed fulcrumed thereon, a tool on said base, a work holder slidably mounted on said rocking bed and having a spindle, a rocking beam pivoted on said bed, a cam shaft journalled in said rocking bed and driven in timed relation to said spindle, a cam on said shaft for moving said work holder back and forth on said rocking bed, a second cam on said shaft for raising and lowering said rocking bed to move the work towards and away from the tool, and a connection between said second cam and rocking beam including a bell crank pivoted on said rocking bed and having one end engaging said second cam, and an adjustable rod between said crank and rocking beam.

10. In a machine of the character described, a fixed bed, a rocking bed fulcrumed thereon, a tool on said fixed bed, a work holder slidably mounted on said rocking bed and having a spindle, a cam shaft journalled in said rocking bed and driven in timed relation to said spindle, a cam on said shaft for moving said work holder back and forth on said rocking bed, a second cam on said shaft for lifting said rocking bed to withdraw the work from the tool on the reverse stroke of the work holder and to lower the rocking bed to bring the work into relation to the tool on the operative stroke of the work holder, and a third cam on said shaft for effecting an intermittent feeding movement of the work to the tool.

11. In a machine of the character described, a fixed bed, a rocking bed, a tool on said fixed bed, a work holder slidably mounted on said rocking bed, a rocking beam pivoted on said rocking bed, and feed mechanism having a variable connection between said fixed bed and said rocking beam, a cam shaft journalled in said rocking bed, a cam on said shaft for moving said work holder back and forth on said rocking bed, a second cam on said shaft, a connection between said second cam and rocking beam through which said second cam rocks said rocking beam to raise and lower the work holder with respect to the tool, and a third cam on said cam shaft controlling said feed mechanism.

12. In a machine of the character described, a base, a rocking bed fulcrumed thereon, a grinding wheel on said base, a work holder slidably mounted on said rocking bed, a rocking beam pivoted on said rocking bed, a cam shaft journalled in said rocking bed, a feed shaft journalled in said rocking bed, an involute cam on said feed shaft, a connection between said cam and rocking beam, a cam on said cam shaft for moving said work holder back and forth on said rocking bed, and a cam on said cam shaft for intermittently rotating said feed shaft.

13. In a machine of the character described, a grinding wheel, a plurality of work spindles adapted to be successively indexed from loading to operative position with respect to said wheel, means for moving said work spindles longitudinally during the grinding operation, means for rotating the work spindles when in operative position, and a gauge for setting pieces of work at loading position.

14. In a machine of the character described, a grinding wheel instrumentality, an indexible carrier instrumentality having a plurality of work spindles adapted to be successively indexed from loading to operative position, means for moving one of said instrumentalities, a driving spindle adapted to be engaged with said work spindles in the same relation when the latter are in operative position, means for holding the work spindles at loading position in the said relation, a gauge at loading position, and means for adjusting pieces of work at loading position to said gauge.

15. In a machine of the character described, a grinding wheel instrumentality, an indexible carrier instrumentality having a plurality of work spindles adapted to be successively indexed from loading to operative position, contour means for moving one of said instrumentalities in accordance with the circumferential contour of the work, means for moving one of said instrumentalities longitudinally of said work spindles, a driving spindle adapted to be engaged with said work spindles in the same relation when the latter are in operative position, means for holding the work spindles at loading position in the same relation, means for locating the pieces of work on said work spindles in the same angular relation and in proper relation to said contour means, and a gauge at loading position.

16. In a machine of the character described, a grinding wheel, an indexible carrier provided with a plurality of work spindles adapted to be successively indexed from loading to operative position, means for moving said carrier radially of said wheel, means for longitudinally moving said carrier in accordance with the pitch of the thread to be ground, and a driving spindle movable with said carrier and adapted to be engaged with the work spindles when the latter are in operative position.

17. In a machine of the character described, a grinding wheel, an indexible carrier provided with a plurality of work spindles adapted to be successively indexed from loading to operative position, means for moving said carrier radially of said grinding wheel, means for moving said carrier longitudinally, a gauge movable with said carrier, and means for adjusting the pieces of work on said work spindles at loading position relative to said gauge.

18. In a machine of the character described, a grinding wheel, an indexible carrier provided with a plurality of work spindles adapted to be successively indexed from loading to operative position, means for longitudinally moving said carrier, a driving spindle driven in timed relation to said last mentioned means and movable with said carrier, said work spindles being adapted to be engaged with said driving spindle in the same relation, an adjustable gauge at loading position, means for holding the work spindles at loading position in the same relation to said gauge, and means for longitudinally adjusting the pieces of work relative to said gauge.

19. In a machine of the character described, a fixed bed, a bed movable relative thereto, a grinding wheel on one of said beds, a work holder slidably mounted on the other of said beds at right angles to the direction in which said movable bed is moved, a carrier mounted on said work holder and having a plurality of work spindles adapted to be successively indexed into operative position with respect to said grinding wheel, means for moving said work holder back and forth substantially in parallelism with said work spindles, means for moving said movable bed to relatively feed the work and the grinding wheel, and means for rotating the work spindles when in indexed operative position.

20. In a machine of the character described, a fixed bed, a tool fixed thereon, a bed movable to and from said tool but fixed against lateral movement relative thereto, a sliding work holder on said movable bed, a carrier supported by said work holder for indexible movement, a plurality of work spindles on said carrier adapted to be successively indexed into operative position with respect to said tool, means for moving said movable bed relative to said tool, means for sliding said work holder back and forth, means driven in timed relation to said last mentioned means and adapted to be engaged in the same relation with said work spindles, means for holding said work spindles at loading position in the same relation, and a gauge for setting the pieces of work at loading position.

21. In a machine of the character described, a fixed bed, a tool fixed thereon, a rocking bed on said fixed bed, a slidable work holder on said rocking bed, a carrier supported by said work holder for indexible movement and having a plurality of work spindles adapted to be successively indexed into operative relation to said tool, means for rocking said bed, means for sliding said work holder, and means for rotating said work spindles when in operative position.

22. In a machine of the character described, a fixed bed, a tool fixed thereon, a bed movable to and from said tool but fixed against lateral movement relative thereto, a sliding work holder on said movable bed, and a work gauge carried by said holder.

23. In a machine of the character described, a fixed bed, a grinding wheel thereon, a bed movable to and from said grinding wheel but fixed against lateral movement relative thereto, a reciprocable work holder on said movable bed and including an indexible carrier provided with a plurality of means for rotatably supporting pieces of work, means for reciprocating said work holder and driven in timed relation to said last mentioned means, and a work gauge mounted on, so as to move with, said work holder.

24. In a machine of the character described, a fixed bed, a grinding wheel thereon, a rocking bed fulcrumed on said fixed bed, a work holder mounted for reciprocation on said rocking bed in parallelism with the axis of the latter and including means for rotatably supporting pieces of work, and a work gauge carried by said work holder.

25. In combination, an indexible carrier having an axle, a head fixed to said axle, a plurality of work spindles rotatably mounted in said head in parallelism with, and at like distances from, the axis of said axle, a second head mounted for longitudinal adjustment on said axle, and a plurality of tail centers in said second head respectively alined with said work spindles and independently adjustable longitudinally.

26. In combination, an indexible carrier, a plurality of work spindles mounted for longitudinal movement in said carrier, a plurality of tail centers respectively alined with said work spindles, means associated with each tail center for adjusting the same, and a spring associated with each work spindle for urging the same towards the respective tail center.

27. In combination, a carrier rotatably indexible about an axis, a plurality of work spindles mounted for longitudinal movement in said carrier, a plurality of tail centers respectively alined with said work spindles, means associated with each tail center for adjusting the same, a spring associated with each work spindle for urging the same towards its respective tail center, and means for adjusting the force of the respective springs.

28. In combination, a carrier indexible about its longitudinal axis, a plurality of work spindles mounted for longitudinal movement in said carrier, a plurality of tail centers respectively alined with said work spindles, means for independently adjusting said tail centers, a spring within each work spindle for urging the same towards the respective tail center, a nut within each work spindle, a screw carried by each nut for adjusting the force of the respective spring, and a collar about each work spindle and connected to a respective nut.

29. In combination, a bearing, a work spindle rotatably mounted therein, work engaging means on one end of said spindle, means on the other end of said spindle through which it is driven, a nut slidably mounted in said spindle, a screw adjustably carried by said nut, a spring between said screw and spindle normally urging the latter in the direction of said work engaging means, a slidable collar about said spindle and connected to said nut, and an abutment against which said collar is urged by said spring.

30. In combination, a fixed bed, a grinding wheel mounted thereon, a rocking bed fulcrumed on said fixed bed, a work holder slidably mounted on said rocking bed and having a head stock and a transversely adjustable tail stock, and a carrier supported for indexible movement between said head and tail stocks and having a plurality of work spindles substantially in parallelism with the axis about which said carrier is indexible.

31. In combination, a grinding wheel, a bed movable towards and away from said wheel, a work holder mounted thereon for longitudinal reciprocating movement, said work holder including a head stock and a tail stock, an indexible carrier supported between said head stock and tail stock and having an axle, a head fixed to said axle, work spindles carried by said head, and adjustable bearing blocks at the ends of said axle cooperating with said head and tail stocks.

32. In combination, a driving spindle, a carrier mounted for indexible movement about an axis spaced from said driving spindle, a plurality of work spindles mounted in said carrier, said driving spindle having a longitudinally movable clutch member, and means for moving said clutch member to engage said driving spindle with, and disengage the same from, the respective work spindles when the latter are indexed into operative position.

33. In combination, a carrier indexible about an axis, a plurality of work spindles on said carrier in parallelism with, but spaced from, said axis, a driving spindle alined with the operative position of said work spindles, and clutch means between said driving spindle and the respective work spindles whereby the latter are always engaged in the same relation with said driving spindle, said clutch means including a clutch tooth rotatable with said driving spindle and a single notch on each work spindle adapted to receive said tooth.

34. In combination, a carrier indexible about an axis, a plurality of work spindles on said carrier in parallelism with, but spaced from, said axis, a driving spindle, and clutch means between said driving spindle and the respective work spindles whereby the latter are always engaged in the same relation to said driving spindle, said clutch means including a pair of clutch teeth rotatable with said driving spindle, one of said teeth being different in length and width than the other of said teeth, each of said work spindles having a pair of notches respectively corresponding in width to said teeth and adapted to respectively receive the same.

35. In combination, a carrier indexible about a given axis, a plurality of work spindles on said carrier in parallelism with, but spaced from, said axis, a driving spindle alined with the operative position of said work spindles, and clutch means between said driving spindle and the respective work spindles whereby the latter are always engaged in the same relation to said driving spindle, said clutch means including a clutch member on said driving spindle having a pair of teeth, one of said teeth being longer and wider than the other one, each of said work spindles having, at its outer end, a pair of notches respectively corresponding in width to, and adapted to respectively receive, said teeth, the portion of the end surface of each work spindle to one side of the notches extending beyond the portion to the other side of the notches.

36. In combination, a head stock, a tail stock, a carrier mounted between said stocks for indexible movement, a plurality of work spindles mounted in said carrier, a driving spindle journalled in said head stock, and clutch means rotatable with said driving spindle and adapted to engage said work spindles.

37. In combination, a work carrier mounted for indexible movement, a plurality of work spindles mounted on said carrier and having longitudinal movement therein, a plurality of tail centers on said carrier alined with the respective work spindles, means for independently adjusting said tail centers, and a driving spindle engageable with the respective work spindles in the same relation when said work spindles are in indexed operative position.

38. In combination, a carrier mounted for indexible movement, a plurality of work spindles on said carrier and adapted to be indexed from loading to operative position, a driving spindle adapted to be successively engaged with said work spindles when the same are indexed to operative position, and means for holding said work spindles against rotation when in loading position.

39. In combination, a carrier indexible about a given axis, a plurality of work spindles mounted on said carrier in parallelism with, and at like distances from, said axis, said work spindles being adapted to be indexed from loading to operative position, a driving spindle engageable with said work spindles in the same relation when the work spindles are in operative position, and means for holding said work spindles in the same relation within the carrier when at loading position.

40. In combination, a carrier indexible about a given axis, a plurality of work spindles on said carrier in parallelism with said axis, a driving spindle alined with the operative position of said work spindles, a plunger alined with the loading position of said work spindles, and clutch means between said driving spindle and the respective work spindles including a clutch tooth rotatable with said driving spindle and a single notch on each work spindle adapted to receive said tooth, said plunger having a tooth similar to said clutch tooth and adapted to be received by said notch of a work spindle when the latter is in loading position.

41. In combination, a head stock and a tail stock, a carrier supported thereby for rotary indexible movement, a plurality of work spindles on said carrier, a driving spindle journalled in said head stock, clutch means rotatable with said driving spindle for engaging the work spindles when in operative position, and a plunger slidably and non-rotatably carried by said head stock and adapted to engage said work spindles when in loading position.

42. In combination, a slidable work holder having a head stock and a tail stock, a carrier mounted for indexible movement between said head and tail stocks, a plurality of work spindles journalled in said carrier, a plurality of tail centers in said carrier respectively alined with said work spindles, means for longitudinally adjusting said tail centers, a work spindle journalled in said head stock, clutch means carried by said driving spindle and adapted to engage work spindles in the same relation, and a plunger carried by said head stock and adapted to engage and hold said work spindles in the same angular relation.

43. In a machine of the character described, a grinding wheel, an indexible carrier having a plurality of work spindles, means for moving said carrier radially of said grinding wheel, means for longitudinally moving said carrier, and means for driving the work spindles when in operative position with respect to said grinding wheel, said driving means being disengaged from said spindles when the latter are in other than operative position and said driving means being engageable with said spindles in the same relation when the latter are in operative position.

44. In combination, a driving spindle, a carrier mounted for indexible movement about an axis parallel to but spaced from said driving spindle, a plurality of work spindles mounted at like distances from said axis, said work spindles being disengaged from said driving spindle when the work spindles are in other than operative position, and means for engaging said driving spindles with said work spindles in the same relation when said work spindles are aligned with said driving spindle.

45. In combination, a pair of supporting centers, a carrier having an axle positioned between said centers, said carrier also having a plurality of work spindles mounted in parallelism with said axle, and a center on each end of said axle respectively cooperating with said first mentioned centers, one at least of said centers being laterally adjustable.

BENGT M. W. HANSON.